INVENTOR
ELLIOT L. GRUENBERG
BY David N. Koffsky
AGENT

United States Patent Office 3,150,320
Patented Sept. 22, 1964

3,150,320

SPACE SATELLITE COMMUNICATIONS SYSTEM EMPLOYING A MODULATOR-REFLECTOR RELAY MEANS

Elliot Lewis Gruenberg, Washington, D.C., assignor to International Business Machines Corporation, New York, N.Y., a corporation of New York Filed May 18, 1962, Ser. No. 195,793
18 Claims. (Cl. 325—3)

This invention relates to improved communications systems and more particularly to communications systems which employ space satellites.

In general, present communications systems which utilize space satellites fall into two basic categories. In the first category, the space satellite is employed as a passive reflector and transmitted electromagnetic energy is merely reflected off it in the direction of the receiving station. Where a passive reflecting satellite of the "Echo" type is used, i.e. an aluminum coated balloon, high power levels are required at the transmitter to insure that the receiving station receives a usable signal. This, of course, is due to the inherent scattering effects of the satellite. In the second category communications system, the space satellite is employed as an active repeater. In this case, the satellite receives transmitted signals, amplifies them and then retransmits the amplified signals in the direction of the receiver. Of the problems inherent in this type of system, the two most important are (1) the need for relatively large power sources in the satellite to drive the active transmitters and (2) the need for precise attitude control means in the satellite to insure that the transmitting antennas remain oriented in the direction of the receiving station. The latter requirement is imposed due to the requirement for high antenna gains which can only be achieved by extremely directional transmitting antennas.

Additional shortcomings of the above-mentioned categories of communications systems are lack of reliability and relatively short lifetimes. The passive reflectors, such as the Echo satellite, are susceptible to breakage from any of a number of factors. An active repeater satellite is dependent for proper operation, upon the satisfactory functioning of each element in the repeater chain. This problem is alleviated, to some extent, by providing redundant repeaters, but this increases the on-board power requirements.

The active repeater satellite also requires active transmission elements which inherently consume themselves in their operation, i.e. cathode electron emission. The operational lifetimes of the satellite power sources and the active transmitter elements determine the basic lifetime of the satellite and, at the present state of the art, this lifetime is not nearly as long as desired.

Accordingly, it is an object of this invention to provide a novel communications system which is characterized by a long-lived reliable space satellite.

A further object of this invention is to provide a novel communications system characterized by the employment of a satellite which enables simultaneous bilateral communications between a plurality of stations.

A further object of this invention is to provide an improved communications system characterized by the employment of an improved modulator-reflector which operates as a spatial relay point.

Another object of this invention is to provide a novel communications satellite which requires a low level of on-board power to operate and has a long inherent lifetime.

A further object of this invention is to provide a novel communications satellite having no requirements for an on-board active transmitter.

Yet another object of this invention is to provide a novel communications satellite characterized by an improved electromagnetic modulator-reflector.

Another object of this invention is to provide an improved communications satellite utilizing a modulated-reflector which inherently prevents undesired reflections.

Still another object of this invention is to provide a novel communications satellite through which simultaneous bilateral communications may be maintained.

Another object of this invention is to provide a novel communications satellite characterized by a modulator-reflector having improved means for amplifying and modulating a received signal.

A recent patent to L. C. Van Atta, 2,908,002, describes an electromagnetic reflector which is particularly suited to satellite applications. Described therein is a reflector which comprises an array of antennas symmetrically disposed about a geometrical center. Symmetrical pairs of antennas are interconnected by transmission lines of equal electrical length. Inasmuch as the reflector inverts the wavefront and subjects each portion thereof to an equal delay, the array effects a reflection of the received energy back in the direction from which it was received. This array is not only equally sensitive to signals received from over a wide angle of view, but also, when a large number of antenna elements are utilized, has the characteristic of forming the reflected energy into a very narrow beam.

In accordance with the present invention, the above-stated objects are obtained by providing a communications system with a space satellite having a modulator-reflector. The modulator-reflector comprises an antenna array of the Van Atta type which has had modulation means inserted in each connecting transmission path between conjugate or symmetrical antennas. Receiver means are connected to control the modulation means. From a first station, a radiating source of unmodulated carrier wave energy is beamed at the satellite, while from a second station, a source of modulated electromagnetic wave energy is also directed towards the satellite. In the satellite, the receiver means detects the modulated electromagnetic wave energy and applies it to control the modulation means in the modulator-reflector. The transmitted carrier wave energy is accepted by the antenna array and modulated by the modulation means in accordance with the energy detected in the receiving means. Information is thereby impressed upon the carrier wave energy while it is being reflected back towards the first station.

In accordance with a modification to the invention described above, the modulator-reflector is altered by inserting in parallel in each electrical transmission path, a plurality of series connected filter means and modulation means. In each transmission path modulation means connected in series with identical filter means are simultaneously controlled so that a plurality of received carriers may be modulated and reflected at the same time. Receiving means which are tuned to receive information modulated energy from a plurality of locations are provide for controlling the aforementioned modulations means.

In accordance with another modification of the invention, the reflecting antenna array also serves as the receiving antenna for the receiving means.

A further modification of the invention envisions the provision of a single amplifier means for amplifying received carrier signals in all transmission paths. Because there is a simultaneous propagation of carrier signals in opposite directions on the transmission paths, it is necessary to convert the received carrier signals into a plurality of sum and difference frequency conversion products to preserve the necessary phase relationships. All of these products are then combined and amplified in a single amplifier means. By filtering and reconverting these conversion products after amplification, the proper phase relationships are re-established. A modification of this amplification apparatus provides a pair of amplifiers in lieu of the aforementioned single amplifier. In this case, all signals travelling in one direction are converted in a plurality of mixers to sum frequency conversion products and all signals travelling in the opposite direction are converted to difference frequency conversion products. The sum and difference frequency conversion products are then each respectively amplified in separate amplifiers and then separated and reconverted back to their original frequency. In each of the above amplification schemes, the amplifiers may be also used as modulators.

The foregoing and other objects, features and advantages of the invention will be apparent from the following more particular description of preferred embodiments of the invention as illustrated in the accompanying drawings in which.

As stated in the introduction and more specifically described in the aforementioned patent, the Van Atta reflecting array effects a narrow beam reflection of an incident electromagnetic wave back in the direction from which it was received. This is accomplished by subjecting all portions of a received wavefront to equal delays while inverting their relative positions and reversing their direction of propagation.

Figure 1:
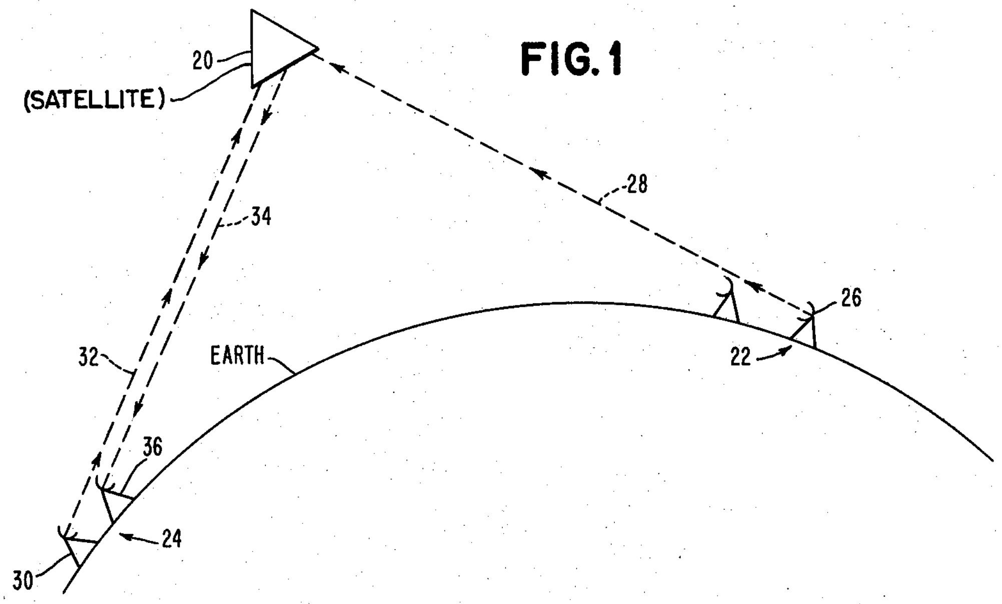
FIG. 1 is a schematic view of a ground-satellite communication system in accordance with one form of the subject invention.

With reference now to FIG. 1, satellite 20, which is in orbit about earth, is shown approximately midway between transmitting station 22 and receiving station 24. Antenna 26 at transmitting station 22 radiates an information modulated electromagnetic signal 28 in the direction of satellite 20. At receiving station 24, transmitting antenna 30 simultaneously beams a high power carrier signal 32 towards the satellite 20. Within satellite 20, there is contained a modulator-reflector which is adapted to receive an unmodulated carrier signal, modulate it and reflect the modulated carrier in a narrow beam back in the direction from which it was received. Also contained in satellite 20 are receiver means adapted to control the modulator portion of the aforementioned modulator-reflector. In operation, the information modulated electromagnetic signal 28 is received by the receiving means in satellite 20 and applied to control the aforementioned modulator portion. The simultaneously transmitted carrier wave 32 is also received in satellite 20, modulated with the information derived from the information modulated electromagnetic signal 28, and reflected back in the direction from which it was received as an information modulated carrier 34. Coincidentally positioned with transmitting antenna 30 is receiving antenna 36 which receives the reflected modulated signal 34.

Figure 2:
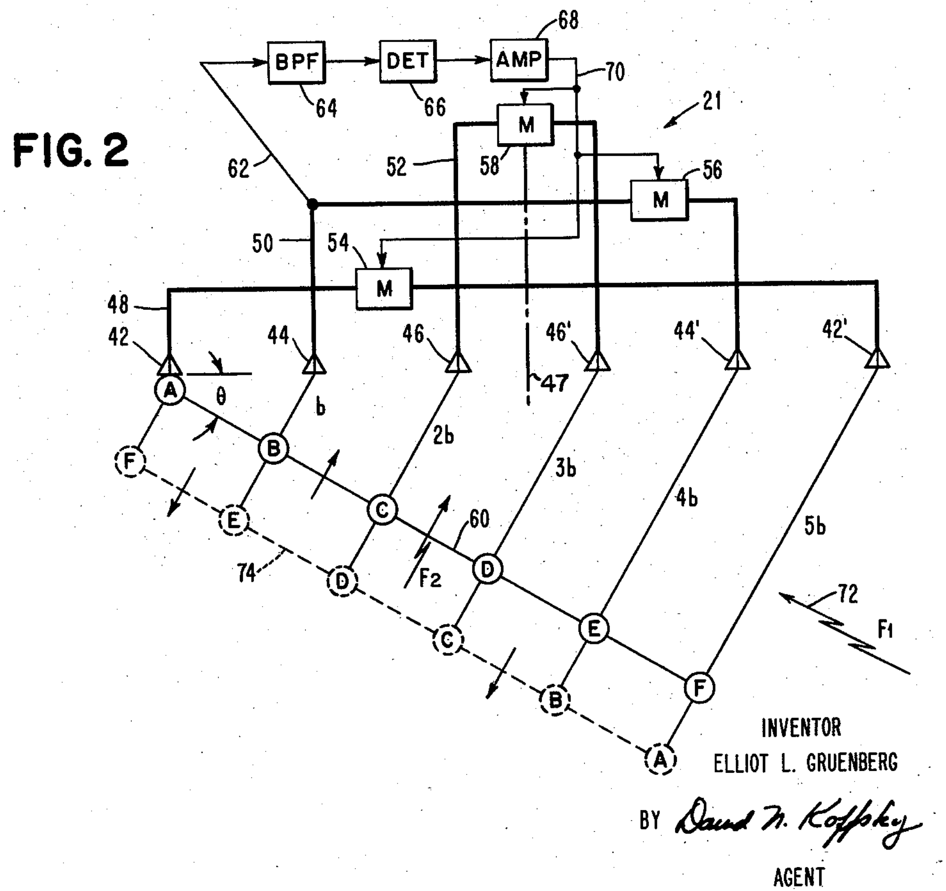
FIG. 2 is a circuit block diagram of a novel satellite utilized in an embodiment of the invention.

FIG. 2 is a block diagram of an embodiment of modulator-reflector and receiving means 21 contained in the satellite 20 shown in FIG. 1. Conjugate pairs of antennas 42–42', 44–44' and 46–46' are connected by electrical transmission paths 48, 50 and 52 respectively. Each pair of antennas is positioned symmetrically about the center line 47 of the antenna array. All of the electrical transmission paths 48, 50 and 52 are substantially equal in electrical length and each thereby acts to impart an identical electrical delay to a received electromagnetic signal. While only three pairs of antennas are shown, in practice it is desirable to use as many pairs as possible, since, by so doing, the gain of the array is enhanced and the reflected beam width narrowed.

Antennas 42–42', 44–44' and 46–46' may be of any well known type, depending upon polarization and weight requirements. One antenna which is suitable for such a configuration is the printed spiral or helical antenna element. Electrical transmission paths or lines 48, 50 and 52 may also be of any well known type, the choice being dependent upon the range of frequencies to which the antenna array is to respond, weight, and tolerable attenuation values. A preferred electrical conductor which represents a reasonable compromise between all of the aforementioned factors is the well known flexible coaxial transmission lines. This cable, besides being light in weight, has the virtue of being able to transmit wide frequency ranges of electromagnetic energy with little attenuation. Another suitable conductor structure is the well known strip line which has many of the same features enumerated for the coaxial conductor.

Inserted in each of transmission lines 48, 50 and 52 are modulators 54, 56 and 58 respectively. The type of modulator used depends upon the particular type of carrier wave modulation desired. In FIG. 2, it is desired to modulate the carrier wave in an on-off or pulsed manner. Of the various types of modulation devices which can accomplish this modulation, the microwave diode switch is preferred since it combines maximum reliability and simplicity with minimum power requirements and weight. There are several diode switches available which perform equally well as modulators—the variable resistance diode or the variable reactance or capacitance diode. Examples of these types of diode switches as well as other schemes of modulation may be found in the copending application of C. M. Johnson Serial No. 194,256, filed May 14, 1962, entitled "Telemetry System" and assigned to the same assignee as this application.

The diode switches are inserted either as series or shunt elements in each of transmission lines 48, 50 and 52. Each diode modulator acts as a switch and, dependent upon the bias applied thereto, either closes or opens its respective transmission lines to the passage of electromagnetic energy. In this manner, either pulse code or pulse duration modulation is accomplished by selectively biasing the diode modulators in accordance with a desired code.

Coupled to transmission line 50 is conductor 62 which feeds the receiving portion of the circuit, that is, band pass filter 54, detector 66, and amplifier 68. Each of antennas 42–42', 44–44' and 46–46' as well as transmission lines 48, 50 and 52 have sufficient frequency response characteristics so as to be responsive to a received carrier signal 60 of frequency $F_2$ or a received information modulated electromagnetic signal 72 of frequency $F_1$. (From this is can be seen that conductor 62 may be coupled to any convenient transmission line, and regardless of where it is connected, will function in a satisfactory manner.) Band pass filter 64 is tuned to pass only the band of frequencies contained around the received information modulated signal 72. Filter 64 thus excludes the carrier wave 60 of frequency $F_2$ from the receiving circuitry. After being passed by band pass filter 64, the information modulated signal 72 is detected by detector 66, amplified in amplifier 68 and applied to line 70 where it simultaneously controls modulators 54, 56 and 58. Assuming that the information modulated signal 72 was pulse modulated, the control signals applied to line 70 will be in the form of energy pulses which control the on-off state of the modulators. As above-mentioned, each diode modulator basically acts as a switch in that, dependent upon the bias applied thereto, it either opens or closes its respective transmission line.

If line 70 is biased so that modulators 54, 56 and 58 close their respective transmission lines (appear invisible to the electromagnetic energy), they do not affect the propagation of a received carrier wave. The operation of the system under this circumstance can best be understood by assuming that incident carrier wave 60 impinges upon the array with an angle of incidence $\theta$. A, B, C, D, E, and F indicate the portions of incident carrier wave 60 which are received by antennas 42, 44, 46, 46′, 44′ and 42′ respectively. Dotted line 74 represents the reflected wavefront as it emerges and is reradiated from the antenna array. The letters encircled by dotted lines indicate the rearrangement of the respective portions of reflected wavefront 74. In the following explanation the position of reflected wavefront 74 is referred to as coincident with that of the incident wavefront 60 but for clarity's sake, it is shown slightly displaced from the incident wavefront.

Since modulators 54, 56 and 58 are assumed to be closed, that is, fully conductive, a signal will propagate from one antenna to its conjugate antenna without interruption. Specifically, portion A of incident carrier wavefront 60 is received by antenna 42, propagates down transmission line 48, through modulator 54, and thence to antenna 42′ where it is reradiated. Likewise, portion F of incident carrier wavefront 60 will traverse an identical path as that of portion A, but in the opposite direction. Note, that at the time when portion F of incident carrier wavefront 60 just emerges from antenna 42, portion A which now forms part of reflected wavefront 74 is at a distance of $5b$ from antenna 42′. Likewise, when it is remembered that each transmission line imparts an identical electrical delay to a received signal, it can be seen that when portion B has emerged to a distance of $4b$ from antenna 44′, portion E will be located at a distance of $b$ from antenna 44. Each portion of the indicent wavefront is therefore delayed an equal amount; its position inverted with respect to other portions; and its direction of propagation reversed through the action of the antenna array. By virtue of this phenomenon, the reflected wavefront 74 re-establishes and reinforces itself along a line coincident with incident wavefront 60 and the main reflection lobe is directed back in the direction from which incident wavefront 60 was recevied.

If, now, the diode modulators are biased so that they open circuit their respective transmission lines, the passage of the carrier signal between conjugate antennas is prevented. It can be shown that if all of the diode modulators were symmetrically positioned about the centerline of the modulator-reflector and biased to their open circuit state, the array would coherently reflect the received carrier energy at an angle of reflection equal to the angle of incidence (similar to a flat plate). A full explanation of this phenomenon is contained in the aforementioned copending Johnson application. Because the reflected wave contains a mirror image of the information being impressed upon the carrier, and is directed away from the receiving station, the symmetrical diode configuration does not have the desirable attribute of communications privacy. To overcome this problem, it has been found that when the modulators are randomly staggered about the centerline of the modulator-reflector, the reflected energy is prevented from reconstituting itself when the diodes are in their open circuit state. Therefore, by randomly staggering the modulators as shown in FIG. 2, a non-coherent phase addition occurs which causes a diffusion of the reflected energy and a resultant loss of the directional and long range propagation properties of the modulator-reflector.

In summary, a communications system such as is shown in FIG. 1 which utilizes a communications satellite containing a modulator-reflector and receiver means 21 as shown in FIG. 2 operates in the following manner: at the transmitting station 22, antenna 26 transmits an information modulated signal 28, and at the receiving station 24, antenna 30 simultaneously transmits an unmodulated carrier signal 32. Each of these transmitted signals is directed at satellite 20 which houses reflector-modulator and receiver means 21. The information modulated signal 72 is received by antenna 44 and impressed upon transmission line 50. This signal is accepted by band pass filter 64 and is passed into detector 66 where it is demodulated and applied to amplifier 68. Amplifier 68 amplifies the demodulated signal and applies it via conductor 70 to control modulators 54, 56 and 58. Assuming that a binary "1" bit was derived from the information modulated signal 72, each of the diode modulators 54, 56 and 58 is biased to close (short circuit) its respective transmission lines. Thus, when the unmodulated carrier signal 60 impinges upon antennas 42–42′, 44–44′ and 46–46′ its propagation along transmission lines 48, 50 and 52 is unimpeded. Under these circumstances, the deflected carrier wavefront 74 is directed back along the path 34 towards receiving antenna 36.

If a binary "0" is derived from information modulated signal 72, the diode modulators 54, 56 and 58 are biased so that they open circuit their respective transmission lines 48, 50 and 52. Thus, the received carrier wavefront 60 is not reflected by the antenna array and is dispersed in such a manner that receiving antenna 36 receives no returned signal. By correlating the returned and non-returned signals, the receiving apparatus at receiving station 24 can synthesize and utilize the digital code which was carried to satellite 20 from transmitting station 22 by the information modulated signal 28.

Figure 3:
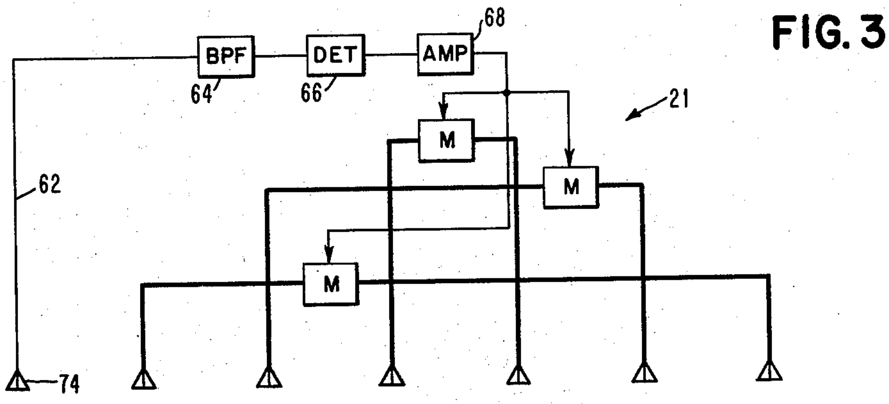
FIG. 3 is a circuit block diagram of a modification of the satellite shown in FIG. 2.

With reference now to FIG. 3 there is shown an alternative embodiment of the satellite. In this embodiment, the information modulated signal is received through a separate antenna 74 instead of being tapped off one of the interconnecting transmission lines of the modulator-reflector. This configuration is most useful when the carrier signal and the information modulated signal differ greatly in their frequency range or when it is required that the information modulated signal be received from a direction which is not within the field of view of the main antenna array.

Figure 4:
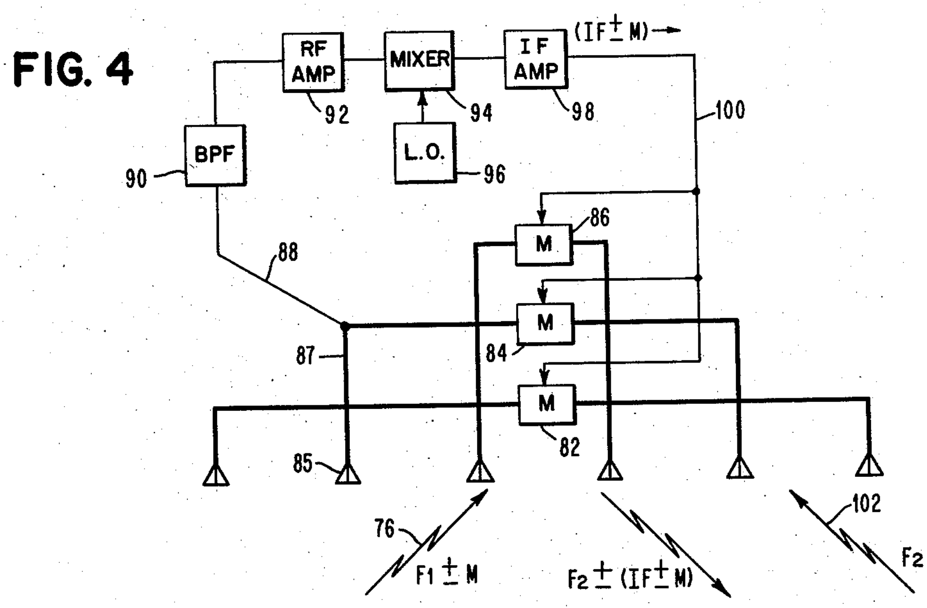
FIG. 4 is a circuit block diagram of an embodiment of a satellite which employs a frequency conversion scheme of modulation.

In FIG. 4, there is shown a circuit block diagram of a satellite having an alternative modulation embodiment for use with either frequency modulation or single sideband systems. In this embodiment modulators 82, 84 and 86 are of the crystal diode variety and perform a frequency mixing function. Since there is no blockage of the received carrier signals with this type of modulation, the modulators are not staggered. If a single side-band or frequency modulated information signal 76 of frequency $F_1$ is received by antenna 85, it is impressed upon transmission line 87. Band pass filter 90 is designed to accept the range of frequencies which occur in the information signal. Therefore, the information signal is coupled by conductor 88 through band pass filter 90 to RF amplifier 92 where it is amplified and applied to mixer 94. Also applied to mixer 94 is the output of local oscillator 96. Within mixer 94, the amplified information modulated signal of frequency $F_1$ is translated down to an intermediate frequency of lower range. Of course, the variations in frequency of the information signal which carry the information are also translated to the aforementioned lower intermediate frequency. The intermediate frequency (IF) signal is amplified in IF amplifier 98 and applied to conductor 100 where it simultaneously controls mixers 82, 84 and 86. Concurrently, incoming carrier wave 102 of frequency $F_2$ is accepted by the antenna array and passes through modulators 82, 84 and 86. The result is that through a frequency mixing function, there is impressed upon the carrier wave, upper and lower side bands which contain the information modulation in the form of frequency variations. For example, assume that the information modulated signal 76 has a basic frequency of 2 kilomegacycles (kmc.). Moreover, assume that local oscillator 96 has a basic frequency of oscillation of 1.9 kmc. Mixer 94 will produce both sum and difference frequency outputs, i.e. 3.9 kmc. and 100 megacycles (mc.). IF amplifier 98, being tuned to the 100 mc. range, amplifies only the lower of the two output frequencies. (Of course, it must be realized at this point that for this particular example, the modulation bandwidth of the information modulated sigal 76 must be less than the 100 megacycle IF, e.g. 10 to 20 mc.)

When carrier signal 102 of frequency $F_2$ (e.g. 5 kmc.) is received by the antenna array and passes through modulators 82, 84 and 86, it is mixed with the 100 mc. IF frequency. The outputs from modulators 82, 84 and 86 basically consist of the original carrier frequency of 5 kmc., an upper sideband whose frequency is the sum of the frequency $F_2$ of carrier signal 102 and the basic IF signal—5.1 kmc.—and a lower sideband whose frequency is the difference between the frequency $F_2$ of carrier signal 102 and the IF frequency, 4.9 kmc. Again it should be realized that these sideband frequencies will vary in accordance with the changes in modulation frequency. At the receiving station (from which the carrier signal was radiated), the receiving antenna is tuned to either the upper or the lower sideband (4.9 or 5.1 kmc.) and thereby derives the information therefrom.

With any of the above-mentioned satellites, bi-lateral as well as the described uni-lateral communications can be achieved. It is obvious that a transmitting-receiving station which is in the receiving mode, upon receiving an end-of-message signal from a transmitting station, could itself begin to transmit information back in the other direction. Of course, a drawback of this type of system is that at any one time, there can be communications only in one direction.

Figure 6:
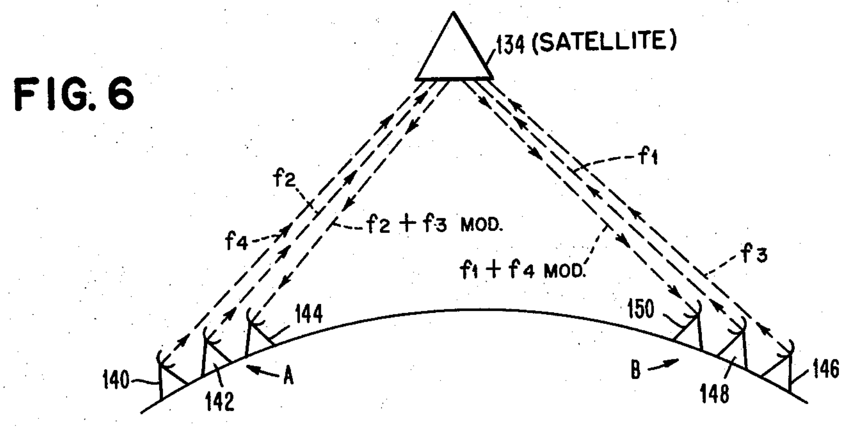
FIG. 6 is a schematic view of a communication system utilizing the satellite shown in FIG. 5.
Figure 5:
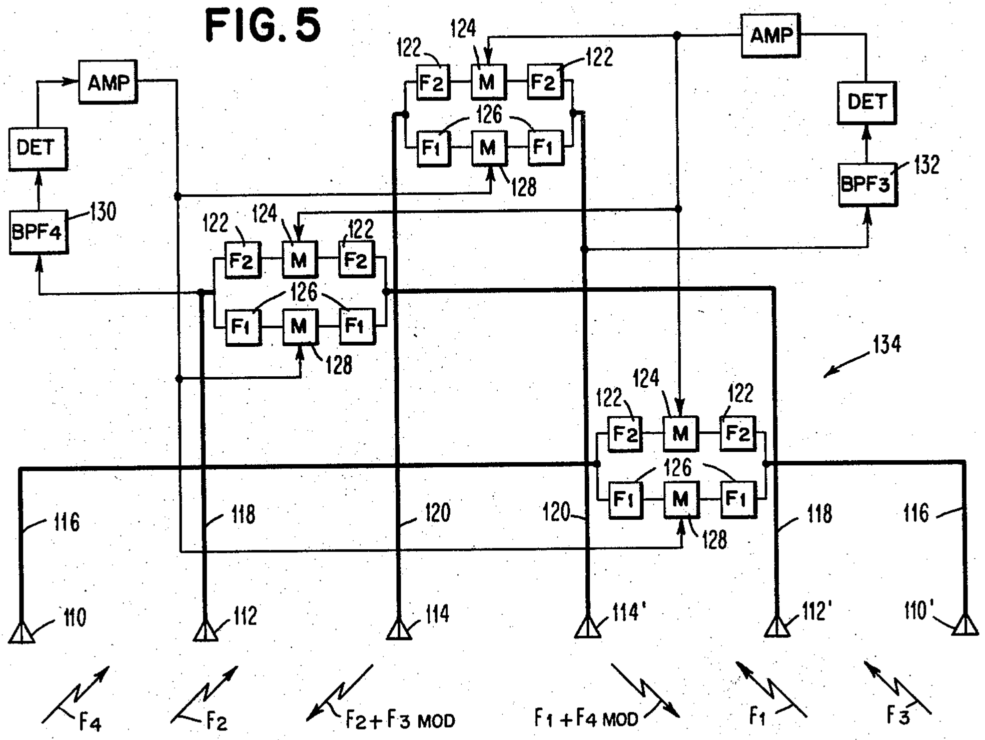
FIG. 5 is a circuit block diagram of a novel satellite through which bilateral communications may be simultaneously maintained.

A communications system which does not have the aforementioned shortcoming is shown in FIGS. 5 and 6. FIG. 5 shows a circuit diagram the satellite which forms the heart of the system. As in the embodiment shown in FIG. 2, conjugate pairs of antennas 110–110′, 112–112′ and 114–114′ are connected by electrical transmission lines 116, 118 and 120 respectively. Inserted in each of the aforementioned transmission lines, is a parallel circuit which in this case consists of two arms, each arm containing a pair of identical filters and a modulator. As in FIG. 2, the electrical lengths of the transmission lines and their associated parallel circuits are substantially equal. It should here be noted that the parallel circuits in each of transmission lines 116, 118 and 120 are identical. For instance, in transmission line 116, one leg of the parallel circuit consists of a pair of filters 122 which are both tuned to a frequency $F_2$ with a modulator 124 connected therebetween. The other leg of the parallel circuit comprises modulator 128 connected between a pair of filters 126 which are tuned to a frequency $F_1$. Transmission lines 118 and 120 contain identical parallel networks.

Coupled to transmission line 118 is bandpass filter 130 which is tuned to accept an information modulated signal of frequency $F_4$. Any information modulated signal passed by filter 130 is detected, amplified and applied simultaneously to each of modulators 128. Remembering that each of modulators 128 is connected between filters 126 which pass only a signal of frequency $F_1$, it can be seen that any information contained on an incoming signal of frequency $F_4$ is impressed upon a signal of frequency $F_1$ as its passes through filters 126 and modulator 128.

Band pass filter 132 is coupled to transmission line 120 and tuned to accept a band of frequencies around a basic frequency of $F_3$. Thus, if an information modulated signal of frequency $F_3$ is received through antenna 114′, it will be passed by bandpass filter 132, detected, amplified and applied to each of modulators 124. The result is a modulation of a signal of frequency $F_2$ (as it passes through modulators 124) with any information derived from the signal of frequency $F_3$. It should be realized that the choice of what transmission line is to be connected to a particular bandpass filter e.g. 132, is arbitrary since the information modulated signals are received equally well on all antennas and transmission lines.

In FIG. 6, satellite 134 is shown positioned between station A and station B. At station A antenna 140 transmits an information modulated signal of frequency $F_4$ towards satellite 134. Transmitting antenna 142, which is also oriented towards satellite 134, transmits an unmodulated carrier signal of frequency $F_2$. Antenna 144 is adapted to receive a reflected carrier wave signal of frequency $F_2$ with any modulation which may be impressed thereon. At station B, antennas 146 and 148 respectively transmit an information modulated signal of frequency $F_3$ and an unmodulated carrier signal of frequency $F_1$ towards satellite 134. Antenna 150 is adapted to receive a reflected carrier of frequency $F_1$ and any modulation thereon. In the configuration shown in FIG. 6 all of the antennas may be in operation simultaneously and effect a simultaneous bi-lateral transmission of information through satellite 134.

In operation, the system works as follows (FIGS. 5 and 6): at station A antenna 140 transmits an information modulated signal of frequency $F_4$. This $F_4$ signal frequency is received at satellite 134 by antenna 112 and is impressed upon transmission line 118. The $F_4$ information signal is accepted by band pass filter 130, detected, amplified and applied to modulators 128. While this operation is occurring, transmitting antenna 148 at station B is continuously transmitting an unmodulated carrier signal of frequency $F_1$. The $F_1$ carrier signal impinges upon each each of the antenna elements 110–110′, 112–112′ and 114–114′, and is impressed upon each of transmission lines 116, 118 and 120. Since the $F_1$ carrier signal can only pass through the parallel arms which contain the $F_1$ filters 126, and the information modulation derived from the $F_4$ information signal is applied to modulators 128, the $F_1$ carrier signal is modulated with the $F_4$ information. To repeat, the $F_1$ carrier signal which was received from station B is modulated in modulators 128 by the information which was carried on the information modulated signal of frequency $F_4$ received from station A. When, therefore, the $F_1$ carrier signal emerges and is reradiated from the antennas of the array, it is both directed back in the direction of station B and contains the information received from station A.

The information transferral process from station B to station A through satellite 134 is similar to that above-described. Specifically, antenna 146 transmits an information modulated signal of frequency $F_3$ which is received in satellite 134 by antenna 114 (among others) and is applied to transmission line 120. This signal is accepted by bandpass filter 132, detected, amplified and simultaneously applied to modulators 124. During this same time, antenna 142 at station A is transmitting an unmodulated carrier signal of frequency $F_2$ towards satellite 134. As this carrier frequency is received in the satellite, it is passed only by the parallel circuit arms which contain the $F_2$ filters 122 and modulators 124. Thus, the information derived from the $F_3$ information modulated signal modulates the $F_2$ carrier signal. When receiving antenna 144 at station A receives the reflected carrier energy, it therefore not only receives the basic $F_2$ carrier signal but also any modulation which was impressed thereon by modulators 124 in satellite 134.

If it is desired to maintain simultaneous communications between more than just two stations, it is merely necessary to add additional parallel networks to each transmission line and provide additional receiver means. The mode of modulation deemed preferable for a system of the above type is pulse modulation; however, this is not to say that frequency mixing, phase reversal or analog schemes of modulation could not also be employed since they would work equally well. It should also be noted that the positions of the pulse modulators in FIG. 5 are randomly staggered to prevent undesired reflections. This provides for communications privacy when the modulators are in their open circuit state.

Certain additional changes can readily be made in the systems shown in FIGS. 1 and 6. For instance, instead of providing separate carrier signal receiving and transmitting antennas at the ground station, a single antenna in combination with a frequency diversity transmitter and receiver could be employed. Thus, while the antenna was transmitting a first carrier frequency, the receiver would be tuned to received another carrier frequency previously transmitted. The transmitter and receiver would be ganged together so that the receiver would always "track" the previously transmitted carrier signal.

In satellite communications systems of the types which have been described above, for a fixed satellite orbit the amplitude of a reflected signal depends largely upon two factors—the number of antenna elements contained in the array, and the power level at the carrier signal transmitting antenna on the ground. By amplifying the received carrier signal in the transmission lines of the array, it is possible to not only reduce the number of antenna elements but also to radically reduce the carrier signal transmission power levels. An obvious expedient would be the insertion of amplifiers in each transmission path. In addition to requiring a large number of active amplifiers, this scheme would also present other problems. It must be remembered, that all phase relationships must be maintained for the modulator-reflector to function properly. With this in mind, phenomena such as varied rates of amplifier aging, changes in component values, and amplifier phase instabilities would adversely affect the required relationships.

Figure 7:
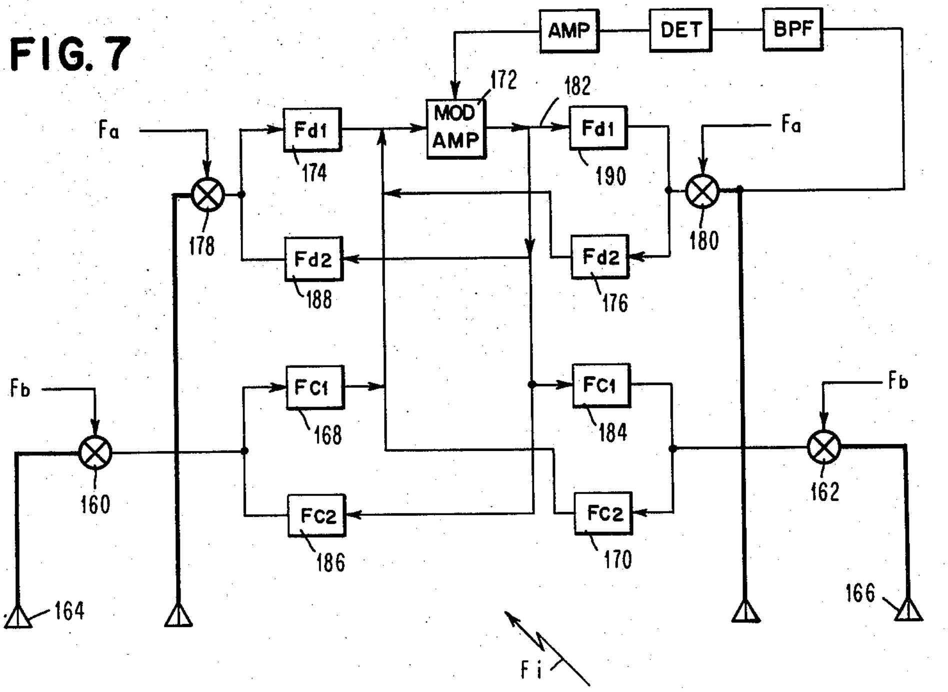
FIG. 7 is an embodiment of a modulator-reflector wherein a single modulator-amplifier is utilized to amplify the signals on all transmission lines.
Figure 8:
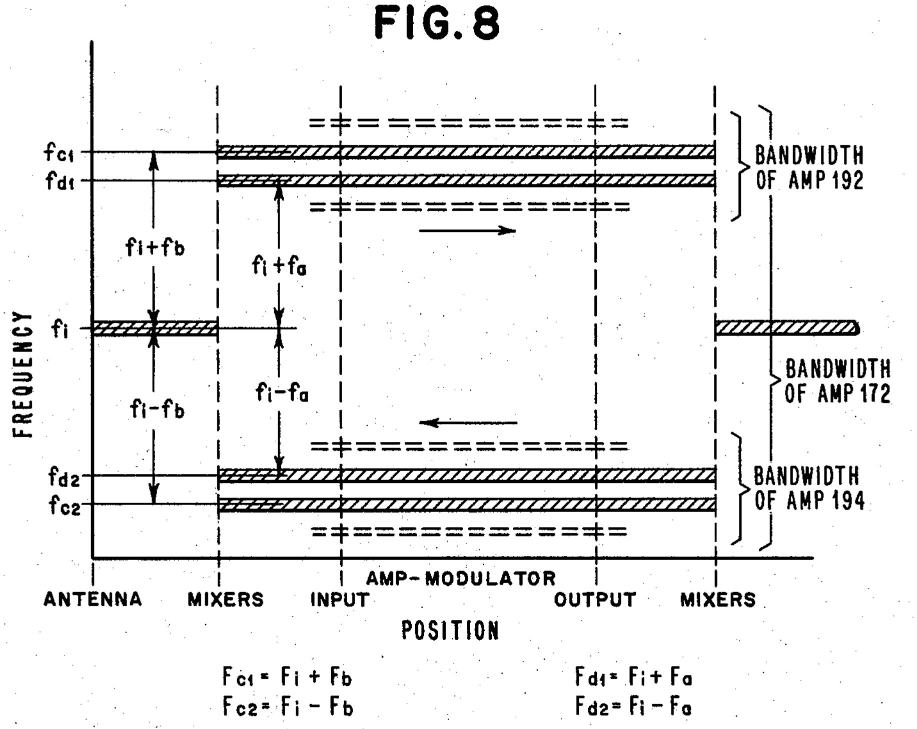
FIG. 8 is a plot of frequency versus position in the embodiments of the inventions shown in FIGS. 7 and 9.

In FIG. 7, a modulator-reflector is shown which alleviates some of the above problems. A single amplifier-modulator 172 is provided to amplify and modulate the carrier signals on all transmission lines. Connected in each transmission line are a pair of mixers, e.g. 160 and 162 through which any carrier signals must pass in entering or leaving the modulator-reflector. A plurality of local oscillators (equal to the number of transmission lines) are provided (not shown) and each oscillator produces a slightly different frequency i.e. $F_a$, $F_b$. Each pair of mixers e.g. 160, 162 in a single transmission line are coupled to a single local oscillator e.g. $F_b$. Thus, when a carrier signal passes through one of the mixers, it is subjected to a frequency mixing action. The output from each pair of mixers is a complex wave having both sum and difference frequency sidebands. The composition of these waves can best be appreciated by referring to the diagram of FIG. 8 where freqeuncy is plotted on the ordinate and position within the modulator-reflector is plotted on the abscissa. A carrier signal of frequency $F_i$ is received by the antenna elements and impressed upon the transmission lines where it is passed to each pair of mixers. As is well known, the frequency conversion products from each mixer will contain both the sum of the local oscillator and carrier signal frequencies, and the difference between the local oscillator and carrier signal frequencies. For instance, the sum and difference frequency products from mixers 160 and 162 may be designated as $F_{c1}$ and $F_{c2}$ where $F_{c1}=F_i+F_b$ and $F_{c2}=F_i-F_b$. Since the local oscillator frequency applied to one pair of mixers differs from that applied to any other pair, then the sum and difference frequency products also differ and are separated by the set frequency increments which separate the local oscillator frequencies.

Referring now back to FIG. 7 the sum and difference frequency conversion products from mixer 160 are fed to filter 168 which passes only the sum frequency. Simultaneously, the sum and difference frequency conversion products from mixer 162 are applied to filter 170, which passes only the difference frequency. The rejected frequencies are dissipated. The sum frequency output from filter 168 and the difference frequency output from filter 170 are both applied to the input of modulator-amplifier 172. In a like manner, filter 174 and filter 176 also apply sum and difference frequencies from mixers 178 and 180 respectively, to modulator-amplifier 172. Modulator-amplifier 172 is wide band amplifier (covers both sum and difference frequency bands) such as a travelling wave tube and is provided with control grids to which a modulation signal may be applied.

The separate sum and difference frequencies are each amplified and modulated in modulator-amplifier 172 and applied as outputs to conductor 182. The sum frequency $F_{c1}$ originally derived from filter 168 is rejected by all other sideband filters except filter 184 which passes it to mixer 162 where it is reconverted back to the carrier wave frequency $F_i$ ($F_b+F_c=F_i$). Likewise, the difference frequency $F_{c2}$ originally derived from filter 170 is passed by filter 186 to mixer 160. Mixer 160, reconverts the $F_{c2}$ difference frequency back to the carrier wave signal frequency $F_i$ and causes it to be reradiated from antenna 164. Similar occurrences take place in the $F_{d2}$ difference frequency filter 188 and $F_{d1}$ sum frequency filter 190 and mixers 178 and 180 respectively. It is thus seen that one set of frequency conversion products are utilized to provide information transmission through the modulator-reflector in one direction while simultaneously, another set of frequency conversion products are used for information flow in the opposite direction, all conversion products being unidirectionally passed through a modulator-amplifier in the process.

Figure 9:
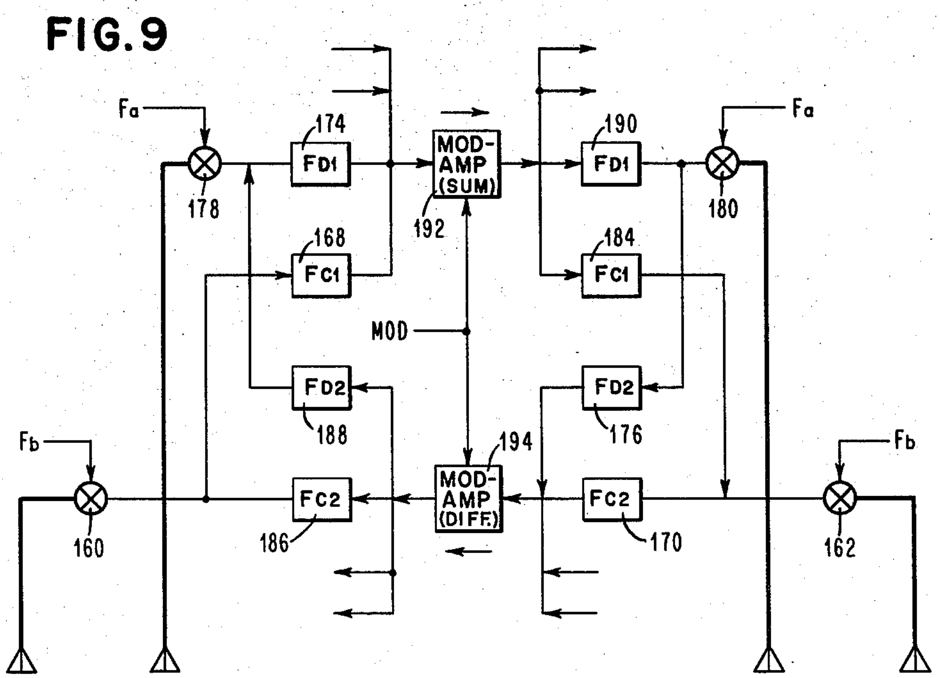
FIG. 9 is a modification of the embodiment shown in FIG. 7 wherein a pair of amplifiers are utilized to amplify the signals on all transmission lines.

In FIG. 9 there is shown a block diagram where the bandwidth requirements for the amplifiers are lessened by providing a pair of amplifiers 192 and 194 in lieu of the single amplifier 172 as shown in FIG. 7. In FIG. 9, the sum frequencies are amplified in modulator-amplifier 192 whereas the difference frequencies are amplified in modulator-amplifier 194. Specifically, the sum frequency outputs from mixers 160 and 178 are passed through sum frequency filters 158 and 174 respectively to the input of modulator-amplifier 192. The difference frequencies from mixers 180 and 162 are respectively applied through mixers 176 and 170 to the input of modulator-amplifier 194. The outputs from amplifiers 192 and 194 are sorted by frequency in the respective sum and difference frequency filters and applied to their respective mixers where they are converted back to the carrier signal frequency and retransmitted.

In the embodiments of the invention shown in FIGS. 7 and 9, the circuit paths between mixers through which the various frequencies must traverse are all constructed equal in electrical length. This requires that the connecting circuitry be made of varying mechanical lengths due to the differences in phase shift which the discrete sum and difference frequencies experience in the filters and amplifiers. An additional point which should be noted is that although the embodiments of the invention in FIGS. 7 and 9 are shown with only two pairs of antennas, in actual practice the number of pairs would be much greater.

The circuits of FIGS. 7 and 9 might also be used in situations where amplification is not required but where a single modulator is desired. In such cases the amplifier would be replaced by a modulator. This embodiment may also be used for combining several lines connecting conjugate antenna elements into a single bus and redistributing them. This is a matter of importance in antenna arrays larger than approximately 10 feet to minimize the weight of the interconnecting leads.

While the invention has been particularly shown and described with reference to preferred embodiments thereof, it will be understood by those skilled in the art that the foregoing and other changes in form and details may be made therein without departing from the spirit and scope of the invention.

I claim:

1. In a communications system, the combination comprising:

a radiating source of information modulated electromagnetic energy;

a radiating source of unmodulated carrier wave energy located at a distance from said source of information modulated electromagnetic energy;

a carrier wave receiver capable of receiving said carrier wave energy positioned coincidentally with said source of unmodulated carrier wave energy; and a satellite at which both said sources may be directed, said satellite including: a plurality of pairs of antennnas adapted to accept at least said unmodulated carrier wave energy, the antennas of each pair being symmetrically disposed about a geometric center common to all said pairs, a plurality of electrical transmission paths, one for each of said pairs of antennas, each of said electrical transmission paths connecting to each other the antennas appertaining to it, all of said electrical transmission paths being substantially equal in electrical length; modulation means in each electrical transmission path; and receiver means adapted to receive said information modulated electromagnetic energy and to apply it to control said modulation means.

2. In a communications system the combination comprising:

a radiating source of information modulated electromagnetic energy;

a radiating source of unmodulated carrier wave energy located at a distance from said source of information modulated electromagnetic energy;

a carrier wave receiver capable of receiving said carrier wave energy positioned coincidentally with said source of unmodulated carrier wave energy; and a satellite at which both said sources may be directed, said satellite including: a plurality of pairs of antennas adapted to accept said unmodulated carrier wave energy, the antennas of each said pair being symmetrically disposed about a geometric center common of all said pairs; a plurality of electrical transmission paths, one for each of said pairs of antennas, each of said electrical transmission paths connecting to each other the antennas appertaining to it, all said electrical transmission paths being substantially equal in electrical length; modulation means in each electrical transmission path; a receiving antenna for receiving said information modulated electromagnetic energy; and receiver means connected between each said modulation means and said receiving antenna for applying received modulated electro-magnetic energy to control said modulation means.

3. In a communications system the combination comprising:

a radiating source of pulse modulated electro-magnetic energy;

a radiating source of unmodulated carrier wave energy located at a distance from said source of pulse modulated electromagnetic energy;

a carrier wave receiver capable of receiving said carrier wave energy positioned coincidentally with said source of unmodulated carrier wave energy; and a satellite at which both said sources may be directed, said satellite including: a plurality of pairs of antennnas adapted to accept at least said unmodulated carrier wave energy, the antennas of each said pair being symmetrically disposed about a geometric center common to all said pairs; a plurality of electrical transmission paths, one of each of said pairs of antennas, each of said electrical transmission paths connecting to each other the antennas appertaining to it, all said electrical transmission paths being substantially equal in electrical length; pulse modulation means in each electrical transmission path, said pulse modulation means being positioned at different intervals between their respective pairs of antennas; a receiving antenna for receiving said modulated electro-magnetic energy; and receiver means connected between each said pulse modulation means and said antenna for applying received modulated electromagntic energy to control said pulse modulation means.

4. In a communications system the combination comprising:

a radiating source of modulated electro-magnetic energy;

a radiating source of unmodulated carrier wave energy located at a distance from said sourse of modulated electromagnetic energy;

a carrier wave receiver capable of receiving said carrier wave energy positioned coincidentally with said source of unmodulated carrier wave energy; and a satellite at which both said sources may be directed, said satellite including: a plurality of pairs of antennas adapted to accept at least said unmodulated carrier wave energy, the antennas of each said pair being symmetrically disposed about a geometric center common to all said pairs; a plurality of electrical transmission paths, one for each of said pairs of antennas, each of said electrical transmission paths connecting to each other the antennas appertaining to it all said electrical transmission paths being substantially equal in electrical length; modulation means in each electrical transmission path; said modulation means being positioned at different intervals between their respective pairs of antennas, a receiving antenna for receiving said modulated electromagnetic energy; and receiver means connected between each said modulation means and said receiving antenna for applying received modulated electromagnetic energy to control said modulation means.

5. In a communications system, the combination comprising:

a radiating source of information modulated electromagnetic energy;

a radiating source of modulated carrier wave energy located at a distance from said source of information modulated electromagnetic energy;

a carrier wave receiver capable of receiving said carrier wave energy, positioned coincidentally with said source of unmodulated carrier wave energy; and a satellite at which both said sources may be directed, said satellite including a modulator-reflector which comprises: a plurality of pairs of antennas adapted to accept said information modulated electromagnetic energy and said unmodulated carrier wave energy, the antennas of each said pair being symmetrically disposed about a geometric center common to all said pairs; a plurality of electrical transmission paths, one for each of said pairs of antennas, each of said electrical transmission paths connecting to each other the antennas appertaining to it, all said electrical transmission paths being substantially equal in electrical length; modulation means in each electrical transmission path; and receiver means connected between each said modulation means and at least one of said antennas for applying received modulated electromagnetic energy to control said modulation means.

6. In a communications system, the combination comprising:

a radiating source of pulse modulated electromagnetic energy;

a radiating source of unmodulated carrier wave energy located at a distance from said source of pulse modulated electromagnetic energy;

a carrier wave receiver capable of receiving said carrier wave energy, positioned coincidentally with said source of unmodulated carrier wave energy; and a satellite at which both said sources may be directed, said satellite including a modulator-reflector which comprises: a plurality of pairs of antennas adapted to accept said pulse modulated electromagnetic energy and said unmodulated carrier wave energy, the antennas of each said pair being symmetrically disposed about a geometric center common to all said pairs; a plurality of electrical transmission paths, one for each of said pairs of antennas, each of said electrical transmission paths connecting to each other the antennas appertaining to it, all said electrical transmission paths being substantially equal in electrical length; pulse modulation means in each electrical transmission path, said pulse modulation means being positioned at different intervals between their respective pairs of antennas; and receiver means connected between each said pulse modulation means and at least one of said antennas for applying received pulse modulated electromagnetic energy to control said pulse modulation means.

7. In a communications system the combination comprising:

a radiating source of modulated electromagnetic energy;

a radiating source of unmodulated carrier wave energy located at a distance from said source of modulated electromagnetic energy;

a carrier wave receiver capable of receiving said carrier wave energy positioned coincidentally with said source of unmodulated carrier wave energy; and a satellite at which both said sources may be directed said satellite including a modulator-deflector which includes: a plurality of pairs of antennas adapted to accept said modulated electromagnetic energy and said unmodulated carrier wave energy, the antennas of each said pair being symmetrically disposed about a geometric center common to all said pairs; a plurality of electrical transmission paths, one for each of said pairs of antennas, each of said electrical transmission paths connecting to each other the antennas appertaining to it, all said electrical transmission paths being substantially equal in electrical length; modulation means in each electrical transmission path; said modulation means being randomly spaced between their respective pairs of antennas; receiver means connected between each said modulation means and at least one of said antennas for applying received modulated electromagnetic energy to control said modulation means.

8. In a system for bilateral communications between a plurality of separated stations, the combination comprising:

a first station including a radiating source of information modulated wave energy of frequency $F_1$, a radiating source of carrier wave energy of frequency $F_2$, and a carrier wave receiver adapted to receive a carrier wave of frequency $F_2$;

a second station including a radiating source of information modulated wave energy of frequency $F_3$; a radiating source of carrier wave energy of frequency $F_4$ and a carrier wave receiver adapted to receive a carrier wave of frequency $F_4$;

a satellite at which all said radiating sources may be directed, said satellite comprising: a plurality of pairs of antennas, the antennas of each said pair being symmetrically disposed about a geometric center common to all said pairs; a plurality of electrical transmission paths, one for each of said pairs of antennas, each of said electrical transmission paths connecting to each other the antennas appertaining to it, all said electrical transmission paths being substantially equal in electrical length; a parallel circuit having a plurality of substantially equal electrical length circuit legs interposed in each transmission path, one leg of said circuit containing in series a first modulator and filter means tuned to said $F_2$ frequency, another leg of said circuit containing in series a second modulator and filter means tuned to said $F_4$ frequency; first receiver means adapted to receive said information modulated wave energy of frequency $F_3$ and to apply it to control said first modulators, and second receiver means adapted to receive said information modulated wave energy of frequency $F_1$ and to apply it to control said second modulators.

9. In a system for bilateral communications between a plurality of separated stations, the combination comprising:

a first station including a radiating source of information modulated wave energy of frequency $F_1$, a radiating source of carrier wave energy of frequency $F_2$, and a carrier wave receiver adapted to receive a carrier wave of frequency $F_2$;

a second station including a radiation source of information modulated wave energy of frequency $F_3$; a radiating source of carrier wave energy of frequency $F_4$ and a carrier wave receiver adapted to receive a carrier wave of frequency $F_4$; and a satellite at which all said radiating sources may be directed, said satellite comprising a plurality of pairs of antennas adapted to accept said carrier wave energies and said information modulated wave energies, the antennas of each said pair being symmetrically disposed about a geometric center common to all said pairs; an electrical transmission path connecting the antennas of each said pair, all said electrical transmission paths being substantially equal in electrical length; a parallel circuit having a plurality of substantially equal electrical length circuit legs interposed in each transmission path, one leg of said circuit containing in series a first modulator and filter means tuned to said $F_2$ frequency, another leg of said circuit containing in series a second modulator and filter means tuned to said $F_4$ frequency; first receiver means connected between at least one of said antennas and the first modulators and adapted to receive said information modulated wave energy of frequency $F_3$ and to apply it to control said first modulators, and second receiver means connected between at least one of said antennas and the second modulators, said second receiver means adapted to receive said information modulated wave energy of frequency $F_1$ and to apply it to control the second modulators.

10. In a system for bilateral communications between a plurality of separated stations, the combination comprising:

a first station including a radiating source of pulse modulated wave energy of frequency $F_1$, a radiating source of carrier wave energy of frequency $F_2$, and a carrier wave receiver adapted to receive a carrier wave of frequency $F_2$;

a second station including a radiating source of pulse modulated wave energy of frequency $F_3$; a radiating source of carrier wave energy of frequency $F_4$ and a carrier wave receiver adapted to receive a carrier wave of frequency $F_4$; and a satellite at which all said radiating sources may be directed, said satellite comprising: a plurality of pairs of antennas adapted to accept said carrier wave energies and said pulse modulated wave energies, the antennas of each said pair being symmetrically disposed about a geometric center common to all said pairs; an electrical transmission path connecting the antennas of each said pair, all said electrical transmission paths being substantially equal in electrical length; a parallel circuit having a plurality of substantially equal electrical length circuit legs interposed in each transmission path, one leg of said circuit containing in series, a first pulse modulator and filter means tuned to said $F_2$ frequency, another leg of said circuit containing in series a second pulse modulator and filter means tuned to said $F_4$ frequency; first receiver means connected between at least one of said antennas and the first pulse modulators and adapted to receive said pulse modulated wave energy of frequency $F_3$ and to apply it to control said first pulse modulators, and second receiver means connected between at least one of said antennas and the second modulators, said second receiver means adapted to receive said pulse modulated wave energy of frequency $F_1$ and to apply it to control said second pulse modulators.

11. The invention as claimed in claim 10 wherein the parallel circuits are randomly positioned in said electrical transmission paths.

12. The invention as claimed in claim 10 wherein the parallel circuits are positioned at different intervals between their respective pairs of antennas.

13. A communications satellite which includes modulator-reflector means, said means comprising:

a plurality of pairs of antennas, the antennas of each said pair symmetrically disposed about a geometric center common to all said pairs;

substantially equal electrical length transmission lines connecting the antennas of each said pair;

a parallel circuit connected in each said transmission line, said circuit including: a plurality of substantially equal electrical length circuit legs, one of said legs containing at least a first modulator and first filter means tuned to the frequency of a first carrier signal, another leg containing at least a second modulator and second filter means tuned to the frequency of a second carrier signal;

first receiver means adapted to receive a first information modulated signal and to apply it to simultaneously control the second modulators; and second receiver means adapted to receive a second information modulated signal and to apply it to simultaneously control the first modulators.

14. A communications satellite which includes modulator-reflector means, said means comprising:

a plurality of pairs of antennas, the antennas of each said pair symmetrically disposed about a geometric center common to all said pairs;

substantially equal electrical length transmission lines connecting the antennas of each said pair;

a parallel circuit randomly positioned in each said transmission line, said circuit including: a plurality of substantially equal electrical length circuit legs, one of said legs containing at least a first modulator and first filter means tuned to the frequency of a first carrier signal, another leg containing at least a second modulator and second filter means tuned to the frequency of a second carrier signal;

first receiver means adapted to receive a first information modulated signal and to apply it to control the second modulators; and second receiver means adapted to receive a second information modulated signal and to apply it to control the first modulators.

15. In a communications satellite, modulator-reflector means which comprise:

a plurality of pairs of antennas adapted to receive a carrier signal, the antennas of each said pair being symmetrically disposed about a geometric center common to all said pairs;

a plurality of oscillator means, one for each said pair of antennas, the frequency outputs of said oscillator means being separated by discrete increments;

wide-band amplifier means;

a plurality of identical electrical length circuits connecting first and second antennas of said pairs through said wide-band amplifier means, each said circuit including: first and second bilateral frequency mixers conected to respective first and second antennas of a pair, both said mixers being fed from an identical one of said oscillator means, each said mixer being adapted to translate a carrier signal frequency received from its connected antenna to sum and difference frequency conversion products and to simultaneously translate a sum or difference frequency conversion product generated by the other mixer back to the frequency of said carrier signal; sum frequency filter means connected between an input to said amplifier means and said first mixer, for passing only the sum frequency conversion product from said first mixer to the input of said amplifier means; difference frequency filter means connected between an input to said amplifier means and said second mixer, for passing only the difference frequency conversion product from said second mixer to the input of said amplifier means; second sum frequency filter means connected between an output from said amplifier means and said second mixer, and adapted to pass to said second mixer only the sum frequency conversion product produced by said first mixer; and second difference frequency filter means connected to said output from said amplifier means and said first mixer means, being adapted to pass to said first mixer the difference frequency conversion products produced by said second mixer, whereby amplified sum and difference frequency conversion products are respectively converted in said second and first mixer means back to the frequency of said carrier signal.

16. The invention as claimed in 15 with the further provision of receiving means adapted to receive information modulated signals and to apply said signals to control said wideband amplifier means.

17. In a communications satellite, modulator-reflector means which comprise:

a plurality of pairs of antennas adapted to receive a carrier signal, the antennas of each said pair being symmetrically disposed about a geomertic center common to all said pairs;

a plurality of oscillator means, one for each said pair of antennas, the frequency outputs of said oscillator means being separated by discrete increments;

a pair of amplifier means;

a plurality of identical electrical length circuits connecting first and second antennas of said pairs through said amplifier means, each said circuit including: first and second bilateral frequency mixers connected to respective first and second antennas of a pair, both said mixers being fed from an identical one of said oscillator means, each said mixer being adapted to translate a carrier signal frequency received from its connected antenna to sum and difference frequency conversion products and to simultaneously translate a sum or difference frequency conversion product generated by the other mixer back to the frequency of said carrier signal; sum frequency filter means connected between an input to one said amplifier means and said first mixer for passing only the sum frequency conversion product from said first mixer to said one amplifier means; difference frequency filter means connected between an input to the other amplifier means and said second mixer, for passing only the difference frequency conversion product from said second mixer to the input of said other amplifier means; second sum frequency filter means connected between an output from said one amplifier means and said second mixer, and adapted to pass to said second mixer only the sum frequency conversion product produced by said first mixer; and second difference frequency filter means connected to said output from said other amplifier means and said first mixer means, being adapted to pass to said first mixer the difference frequency conversion products produced by said second mixer, whereby amplified sum and difference frequency conversion products are respectively converted in said second and first mixer means back to the frequency of said carrier signal.

18. The invention as claimed in claim 17 with the further provision of means for simultaneously applying a modulating signal to said pair of amplifier means.

No references cited.

UNITED STATES PATENT OFFICE
CERTIFICATE OF CORRECTION

Patent No. 3,150,320 September 22, 1964

Elliot Lewis Gruenberg

It is hereby certified that error appears in the above numbered patent requiring correction and that the said Letters Patent should read as corrected below.

Column 2, lines 57 and 58, for "provide" read -- provided --; line 58, for "modulations" read -- modulation --; column 4, line 67, for "is" read -- it --; column 5, line 55, for "recevied" read -- received --; column 6, line 29, for "deflected" read reflected --; column 8, line 43, strike out "each", first occurrence --; column 10, line 27, for "$F_i(F_b+F_c=F_i)$" read -- $F_i(F_b+F_{c1}=F_i)$ --; column 11, line 73, after "energy" insert a comma; column 12, line 6, for "of", first occurrence, read -- for --; line 24, for "sourse" read -- source --; line 38, after "it" insert a comma; column 14, line 28, for "radiation" read -- radiating --; column 16, line 42, after "in" insert -- claim --; line 49, strike out "said".

Signed and sealed this 19th day of January 1965.

(SEAL)
Attest:

ERNEST W. SWIDER
Attesting Officer

EDWARD J. BRENNER
Commissioner of Patents